US 6,725,334 B2

(12) United States Patent
Barroso et al.

(10) Patent No.: US 6,725,334 B2
(45) Date of Patent: Apr. 20, 2004

(54) METHOD AND SYSTEM FOR EXCLUSIVE TWO-LEVEL CACHING IN A CHIP-MULTIPROCESSOR

(75) Inventors: Luiz Andre Barroso, Mountain View, CA (US); Kourosh Gharachorloo, Menlo Park, CA (US); Andreas Nowatzyk, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 09/877,530

(22) Filed: Jun. 8, 2001

(65) Prior Publication Data

US 2002/0010836 A1 Jan. 24, 2002

Related U.S. Application Data

(60) Provisional application No. 60/210,655, filed on Jun. 9, 2000, and provisional application No. 60/210,675, filed on Jun. 10, 2000.

(51) Int. Cl.$^7$ .............................................. G06F 12/00
(52) U.S. Cl. .................. 711/122; 711/118; 711/119; 711/130; 711/141; 711/147; 711/150; 711/120; 711/117; 711/145; 711/124
(58) Field of Search ................................ 711/130, 118, 711/119, 122, 120, 141, 142–146, 147, 150

(56) References Cited

U.S. PATENT DOCUMENTS

| | | | | |
|---|---|---|---|---|
| 5,197,139 A | * | 3/1993 | Emma et al. | 711/207 |
| 5,210,848 A | * | 5/1993 | Liu | 711/124 |
| 5,386,547 A | | 1/1995 | Jouppi | |
| 5,634,068 A | * | 5/1997 | Nishtala et al. | 711/141 |
| 5,875,462 A | * | 2/1999 | Bauman et al. | 711/119 |
| 6,292,705 B1 | * | 9/2001 | Wang et al. | 700/5 |
| 6,374,332 B1 | * | 4/2002 | Mackenthun et al. | 711/145 |
| 6,625,698 B2 | * | 9/2003 | Vartti | 711/141 |
| 6,636,948 B2 | * | 10/2003 | Steely, Jr. et al. | 711/141 |

OTHER PUBLICATIONS

Agarwal, Anant, et al., "An Evaluation of Directory Schemes for Cache Coherence", *Proceedings of 15$^{th}$ International Symposium on Computer Architecture* ("*ISCA*") (May 1998) pp. 280–289.

Barroso, Luiz Andre, et al., "Impact of Chip–Level Integration on Performance of OLTP Workloads", *High–Performance Computer Architecture* ("*HPCA*") (Jan. 2000).

Barroso, Luiz Andre, et al., "Memory System Characterization of Commercial Workloads", *ISCA* (Jun. 1998).

(List continued on next page.)

*Primary Examiner*—Matthew Kim
*Assistant Examiner*—Zhuo H. Li

(57) ABSTRACT

To maximize the effective use of on-chip cache, a method and system for exclusive two-level caching in a chip-multiprocessor are provided. The exclusive two-level caching in accordance with the present invention involves method relaxing the inclusion requirement in a two-level cache system in order to form an exclusive cache hierarchy. Additionally, the exclusive two-level caching involves providing a first-level tag-state structure in a first-level cache of the two-level cache system. The first tag-state structure has state information. The exclusive two-level caching also involves maintaining in a second-level cache of the two-level cache system a duplicate of the first-level tag-state structure and extending the state information in the duplicate of the first tag-state structure, but not in the first-level tag-state structure itself, to include an owner indication. The exclusive two-level caching further involves providing in the second-level cache a second tag-state structure so that a simultaneous lookup at the duplicate of the first tag-state structure and the second tag-state structure is possible. Moreover, the exclusive two-level caching involves associating a single owner with a cache line at any given time of its lifetime in the chip-multiprocessor.

18 Claims, 7 Drawing Sheets

OTHER PUBLICATIONS

Eggers, Susan J., et al., "Simultaneous Multithreading: A Platform for Next-generation Processors", *University of Washington, DEC Western Research Laboratory* ({eggers, levy,jlo}@cs.washington.edu) ({emer,stamm}@vssad.enet.dec.com) pp. 1–15.

Eickemeyer, Richard J., et al., "Evaluation of Multithreaded Uniprocessors for Commercial Application Environments", *ACM* (1996) (0–89791–786–3) pp. 203–212.

Gupta, Anoop, et al., "Reducing Memory and Traffic Requirements for Scalable Directory–Based Cache Coherence Schemes", *Stanford University, Computer Systems Laboratory* pp. 1–10.

Hammond, Lance, et al., "A Single–Chip Multiprocessor", *IEEE* (Sep. 1997) (0018–9162).

Hammond, Lance, et al., "Data Speculation Support for a Chip Multiprocessor", *Stanford University, Computer Systems Laboratory* (http://www-hydra.stanford.edu/).

Jouppi, Norman P., et al., "Tradeoffs in Two–Level On–Chip Caching", *WRL Research Report 93/3, Western Research Laboratory* (WRL-Techreports@decwrl.dec.com) (Dec. 1993) pp. 1–31.

Krishnan, Venkata, et al., "Hardware and Software Support for Speculative Execution of Sequential Binaries on a Chip–Multiprocessor", *University of Illinois at Urbana–Champaign* (http://iacoma.cs.uiuc.edu).

Kuskin, Jeffrey, et al., "The Stanford FLASH Multiprocessor", *Stanford University, Computer Systems Laboratory*.

Laudon, James, et al., "The SGI Origin: A ccNUMA Highly Scalable Server", *Silicon Graphics, Inc.* (Laudon@sgi.com).

Lenoski, Daniel, et al. "The Directory–Based Cache Coherence Protocol for the DASH Multiprocessor", *IEEE* (1990) (CH2887–8) pp. 148–159.

Nayfeh, Basem A., et al., "Evaluation of Design Alternatives for a Multiprocessor Microprocessor", *ACM* (1996) (0–89791–786–3) pp. 67–77.

Nowatzyk, Andreas G., et al., "S–Connect: from Networks of Workstations to Supercomputer Performance", $22^{nd}$ *Annual International Symposium on Computer Architecture* ("*ISCA*") (Jun. 1995).

Nowatzyk, Andreas, et al., "Exploiting Parallelism in Cache Coherency Protocol Engines", *Sun Microsystems Computer Corporation*.

Olukotun, Kunle, et al., "The Case for a Single–Chip Multiprocessor", *Proceedings Seventh International Symposium Architectural Support for Programming Languages and Operating Systems* ("*ASPLOS VII*") (Oct. 1996).

Steffan, J. Gregory, et al., "The Potential for Using Thread–Level Data Speculation to Facilitate Automatic Parallelization", *HPCA–4* (Feb. 1998) pp. 1–12.

Tremblay, Marc, "MAJC™–5200 AVLIW Convergent MPSOC", *Sun Microsystems, Inc., Microprocessor Forum* (1999).

Kunkel, Steven, et al., "System Optimization for OLTP Workloads", *IEEE* (1999) (0272–1732) pp. 56–64.

Diefendorff, Keith, "Power4 Focuses on Memory Bandwidth", *Microdesign Resources, Microprocessor Report vol. 13* No. 13 (Oct. 1999).

Hammond, Lance, et al., "The Stanford Hydra CMP", *Stanford University Computer Systems Laboratory* (http://www-hydra.stanford.edu).

* cited by examiner

| t bits | i bits | m bits |
|---|---|---|
| Tag | Index (set mapping function) | Byte Select (offset w/in block) | physical address: M bits (32/44/62)

301  302  303

30

METHOD AND SYSTEM FOR EXCLUSIVE TWO-LEVEL CACHING IN A CHIP-MULTIPROCESSOR

REFERENCE TO PRIOR APPLICATION

This application claims the benefit of and incorporates herein by reference U.S. Provisional Application No. 60/210,655 filed Jun. 9, 2000 and U.S. Provisional Application No. 60/210,675 filed Jun. 10, 2000.

REFERENCE TO RELATED APPLICATION

This application is related to and incorporates herein by reference U.S. application by L. A. Barroso et al., Ser. No. 09/877,793, filed Jun. 8, 2001, and entitled "A Scalable Architecture Based on Single-chip Multiprocessing."

BACKGROUND OF THE INVENTION

1. Field of the Invention

This application relates to microprocessor design and, specifically, to cache memory systems in microprocessors.

2. Background Art

The performance of applications such as database and web servers (hereafter "commercial workloads") is an increasingly important aspect in high-performance servers. Data-dependent computations, lack of instruction-level parallelism and large memory stalls contribute to the poor performance of commercial workloads in traditional high-end microprocessors.

Two promising approaches for improving the performance of commercial workloads are lower-latency memory systems and the exploitation of thread-level parallelism. Increased density and transistor counts enable microprocessor architectures with integrated caches and memory controllers, which reduce overall memory latency. Thread-level parallelism arising from relatively independent transactions or queries initiated by individual clients enables the exploitation of thread-level parallelism at the chip level. Chip multiprocessing (CMP) and simultaneous multithreading (SMT) are the two most promising approaches to exploit such thread-level parallelism. SMT enhances a traditional wide-issue out-of-order processor core with the ability to issue instructions from different threads in the same cycle. CMP consists of integrating multiple CPU cores (and corresponding level-one caches) into a single chip.

The main advantage of the CMP approach is that it enables the use of simpler CPU cores, therefore reducing overall design complexity. A CMP approach naturally lends itself to a modular design, and can benefit from the on-chip two-level caching hierarchy. In the on-chip two-level caching hierarchy, each first-level cache is associated with and is private to a particular CPU and the second-level cache is shared by the CPUs. However, conventional CMP designs with on-chip two-level caching require the contents of first-level caches to be also present in the second-level caches, an approach known as the inclusion or subset property. With an inclusive two-level caching implementation, an increase in the number of CPUs per die increases the ratio between the aggregate first-level cache capacity and the second-level cache capacity. When this ratio approaches 1.0, nearly half of the on-chip cache capacity can be wasted with duplicate copies of data. Hence, a design that does not enforce inclusion (e.g., an exclusive design) is advantageous and often preferred over the design of inclusive two-level caching.

Exclusive two-level caching has been previously proposed in the context of single processor chips. An example of exclusive two-level caching implemented in a single processor is provided in U.S. Pat. No. 5,386,547, issued to Norman P. Jouppi on Jan. 31, 1995, which is incorporated herein by reference. this invention is the first to address it for CMP systems. This invention also describes new mechanisms to manage effectively a two-level exclusive cache hierarchy for a CMP system.

But, even with exclusive two-level caching, there are performance issues to be addressed in CMP design. Particularly, there is a need to improve mechanisms for effective management of exclusive two-level caching in CMP systems. The present invention addresses these and related issues.

SUMMARY OF THE INVENTION

Hence, in accordance with the purpose of the invention, as embodied and broadly described herein, the invention relates to chip multiprocessors (CMP) design. In particular, the present invention provides a system and method that maximizes the use of on-chip cache memory capacity in CMP systems. The system and method are realized with a combination of features. One such feature is a relaxed subset property (inclusion) requirement. This property forms an exclusive cache hierarchy in order to minimize data replication and on-chip data traffic without incurring an increased second level hit latency or occupancy. Another aspect of the combination involves maintaining in the second-level cache a duplicate tag-state structure of all (per-CPU) first-level caches in order to allow a substantially simultaneous lookup for data in the first-level and second-level tag-state arrays.

An additional aspect involves extending the state information to include ownership indication in addition to the data validity/existence indication and data shared/exclusive indication. The ownership aspect lives in the exclusive two-level cache hierarchy and helps orchestrate write-backs to the second-level cache (i.e., L2 fills). Another aspect involves associating a single owner with each cache line in order to eliminate redundant write-backs of evicted data to the second-level cache. Namely, at any given time in the lifetime of a cache line in the CMP chip, only one of its copies can be the owner copy.

Finally, the present invention provides policy-guidelines for administering the ownership and write-back aspects, as the following guidelines exemplify: 1) a first-level cache miss that finds no other copy of a requested cache line becomes the owner of the cache line; 2) a first-level cache miss that does not find a copy of a cache line in the second-level cache but finds it in one or more than one of the first-level caches receives that cache line from the previous owner and becomes the new owner; 3) a first-level cache that replaces a cache line, is informed by the second-level cache whether it is the owner, in which case it issues a second level cache fill; 4) whenever the second-level cache has a copy of the cache line, it is the owner. A first-level cache miss that hits in the second-level cache without invalidating it (i.e., not a write miss) does not steal ownership from the second-level cache; and 5) whenever the second-level cache needs to evict a cache line that is additionally present in one or more first-level caches the second-level cache arbitrarily selects one of these first-level caches as the new owner.

Advantages of the invention will be understood by those skilled in the art, in part, from the description that follows. Advantages of the invention will be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

The present invention is directed to cache memory systems in microprocessors and more specifically, to a system and method for maximizing the effective use of cache memory systems within multiprocessing systems. As a functional and architectural strategy, the invention contemplates a chip multiprocessors (CMP) design that maximizes the effective use of on-chip cache memory capacity, and consequently improves overall memory system performance. In broad terms, this strategy is realized by: 1) relaxing the subset property (inclusion) requirement, thereby forming an exclusive cache hierarchy, in order to minimize data replication and on-chip data traffic without incurring increased second-level hit latency or occupancy; 2) maintaining in the second-level cache a duplicate tag-state structure of all first-level caches in order to allow a simultaneous lookup for data in the first-level and second-level tag-state arrays; 3) extending the state information to include an ownership indication in addition to the data validity/existence and data shared/exclusive indications; and 4) associating a single owner with each cache line in order to eliminate multiple write-backs of evicted data to the second-level cache. In the case of a shared cache line, at any point in time only one among a plurality of first-level caches that can hold a copy of the cache line and the second level cache can be the owner—hence the term single owner. In the case of an exclusive cache line, naturally, only one cache is the owner.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

Figure 1:
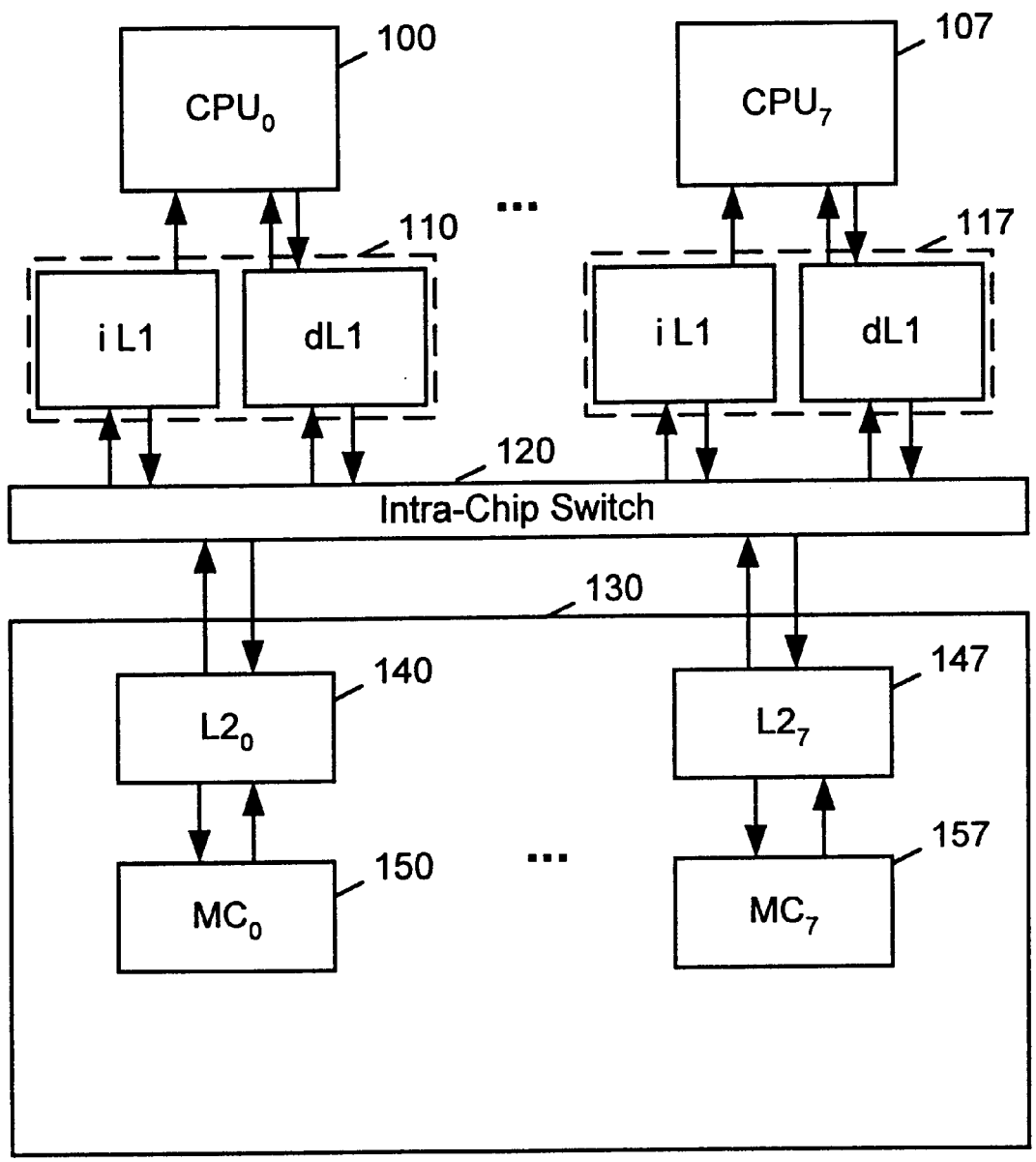
FIG. 1 shows a chip multiprocessors (CMP) design implementation ("CMP system") that embodies the present invention.
Figure 2:
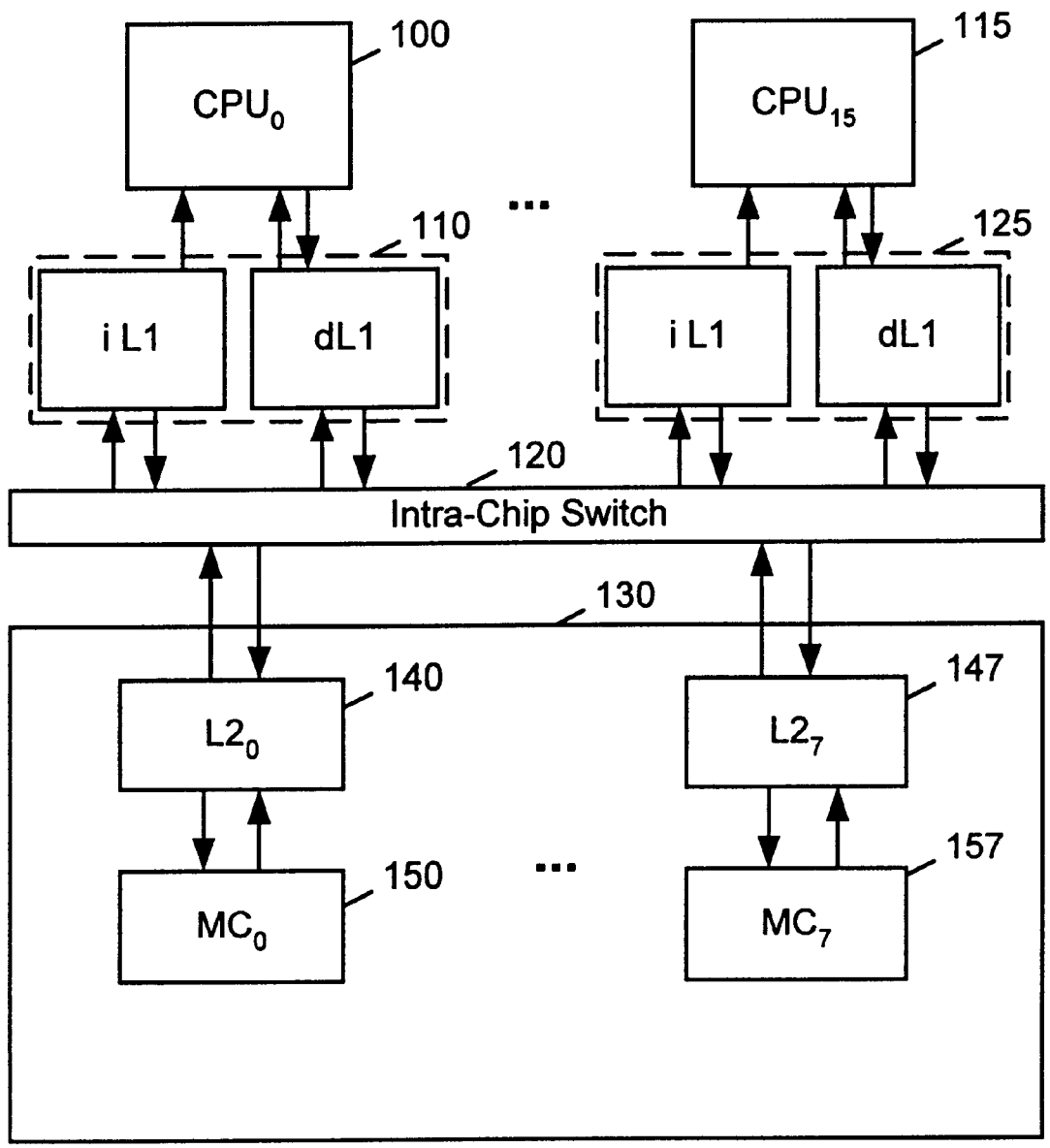
FIG. 2 shows a second CMP system that embodies the present invention.

As mentioned, the present invention involves a CMP design that provides considerable functional and architectural advantages over conventional microprocessor designs. FIGS. 1 and 2 show CMP design implementations embodying the present invention (hereafter collectively referred to as the "CMP system"). It should be clear that a CMP chip embodies the CMP system although it may include additional elements that are not outlined herein without departing from the scope and spirit of the present invention. As shown in FIGS. 1 and 2, the respective exemplary CMP systems implement a modular design with a processor core consisting correspondingly of eight (8) and sixteen (16) central processing units (CPUs) 100, . . . 107/115, i.e., $CPU_0, \ldots CPU_7$ and $CPU_0, \ldots CPU_{15}$. The number of CPUs per CMP system may change however without departing from the scope and spirit of the present invention. The CMP system includes per-CPU first-level instruction (iL1) and data (dL1) caches 110, . . . 117/125. Namely, each CPU 100, . . . 107/115 is configured for interfacing with a dedicated first-level cache memory (L1) 110, . . . 117/125 that is private to that CPU. Preferably, for simplicity, the instruction cache (iL1) and data cache (dL1) are designed similarly (and are hereafter referred to generically as the "first-level cache", or "L1"). The second-level cache ("L2") 130 is a combined instruction and data cache that is logically shared by all the CPUs 100, . . . 107/115. The first-level caches 110, . . . 117/125 interface with the second-level cache 130 through an interconnect facilitator referred to herein as the intra-chip switch (ICS) 120.

It is noted that the reason for having the second-level cache is the size limitations imposed on the first-level cache in order to maintain its speed. The first-level caches are required to respond to CPU requests very fast. The speed of first-level caches drops off with increases in their size. Accordingly, the second-level cache, which is slower than the first-level caches but is faster than the main memory, is interposed between the first-level caches and the main (off-chip) memory. The second-level cache keeps data that does not fit in the first-level caches; and this is sufficiently close to the CPUs that data can be obtained in about 10–20 cycles as opposed to the 200–300 cycles associated with the main memory. Namely, the second-level cache facilitates efficient execution of instructions involving memory operations.

As to caches in general, a cache can be characterized such that if one cache location is accessed then nearby memory locations are likely to be accessed as well. In order to exploit this access pattern caches often operate on several words at a time grouped as a cache line or a cache block; and read/write instructions operate on whole cache lines. The address space of a N-way set associative cache is divided into sets of N blocks of m bytes (the size of each cache line). A two-way set associative cache has two blocks (cache lines) in each set. To access a cache block, say block B in the cache, a block address is mapped associatively to set "B mode N". The bottom m bits of the block address correspond to an offset within the cache line and are thus discarded from the cache line address. The remaining top address bits are the block address stored as a tag along with the cache line.

Figures 3, 5A:
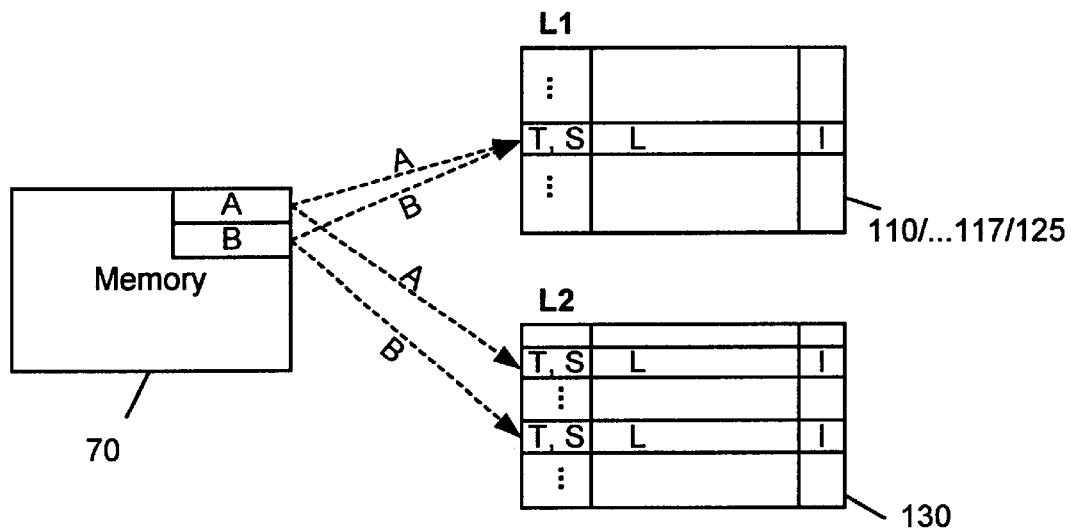
FIG. 3 illustrates a physical address used in the CMP system.
FIGS. 5A, 5B and 6 illustrate the cache memory system operation of a CMP system that embodies the present invention.

FIG. 3 illustrates a physical address of a cache block used in the CMP system of FIGS. 1 and 2. The physical address comprises 32, 44, 64 or any other number of M bits. The bottom m bits 303 yield the byte selection or offset within the cache block. The next set of k bits 302 yields the index that identifies the set of blocks or, in other words, a set mapping function. The most significant t bits 301, are used for tag ("T") and state ("S") information. The tag (T) typically indicates the (off-chip) memory address from which the cache line came from. The state (S) is composed of a number of bits one of which being a valid bit that indicates whether anything is contained (valid) in the cache line or, alternatively, that the cache line has not yet had anything stored therein.

Figure 4:
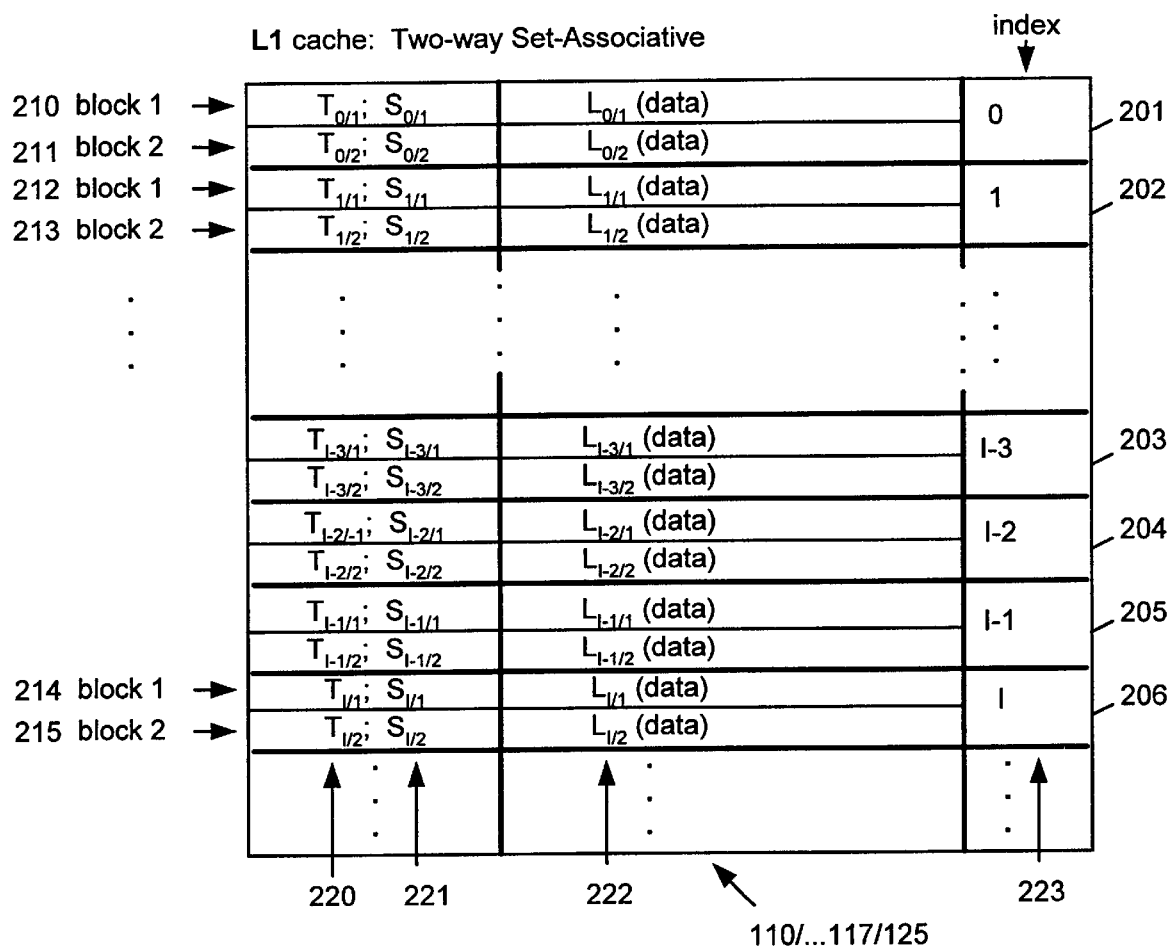
FIG. 4 illustrates a first-level (L1) cache used in the cache memory system of the CMP system implementation of FIGS. 1 and 2.

In the CMP system, each first-level cache (L1) 110, . . . 117/125 and the second-level cache can be configured as an N-way set associative cache. Preferably, each first-level cache (L1) is a two-way set associative cache with indices, tags and states. FIG. 4 provides an illustration of the first-level data cache, dL1 (and by analogy a first-level instruction cache, iL1, which is not shown). As illustrated in FIG. 4, each set of, say, I sets, has cache block 1 (210, 212, ... 214) and cache block 2 (211, 213, ... 215). The tag (T) field 220 in each cache block (or line) identifies which data (or by analogy instruction) from main (off-chip) memory that is currently stored in the first-level cache (L1). The value stored in each tag 220 determines whether a cache lookup results in a hit or miss. A conflict miss for instance occurs when more than one block address maps to the same set (as shown in FIG. 5A where A & B map to the same cache line in L1). As will be later explained, a write-back to the second-level cache results only from a conflict miss and the need to evict a line from the first-level cache.

In the illustrated implementation, the state (S) field 221 in each cache line of L1 has state bits, including: 1) a valid bit for providing the exists/invalid indication; and 2) a bit for the shared/exclusive indication. The shared/exclusive bit indicates whether the cache line is shared by a number of CPUs or is exclusive to a particular CPU. It is noted that ownership information (non-/owner bit) is not kept at the first-level cache (L1).

Returning for a moment to FIGS. 1 and 2, for a description of the second-level cache. In the illustrated modular design implementation, the second-level cache 130 can be made out of eight (8) interleaved modules each of which having its own tag, state and data storage (L2) 140, ... 147, a memory controller (MC) 150, ... 157, and a bank of DRAM (dynamic random access memory) components 160, 167. In order to reduce miss latency, and reduce data duplication, L1 misses that also miss L2, are filled directly from memory 170 without allocating a line in L2 130.

Figure 5B:
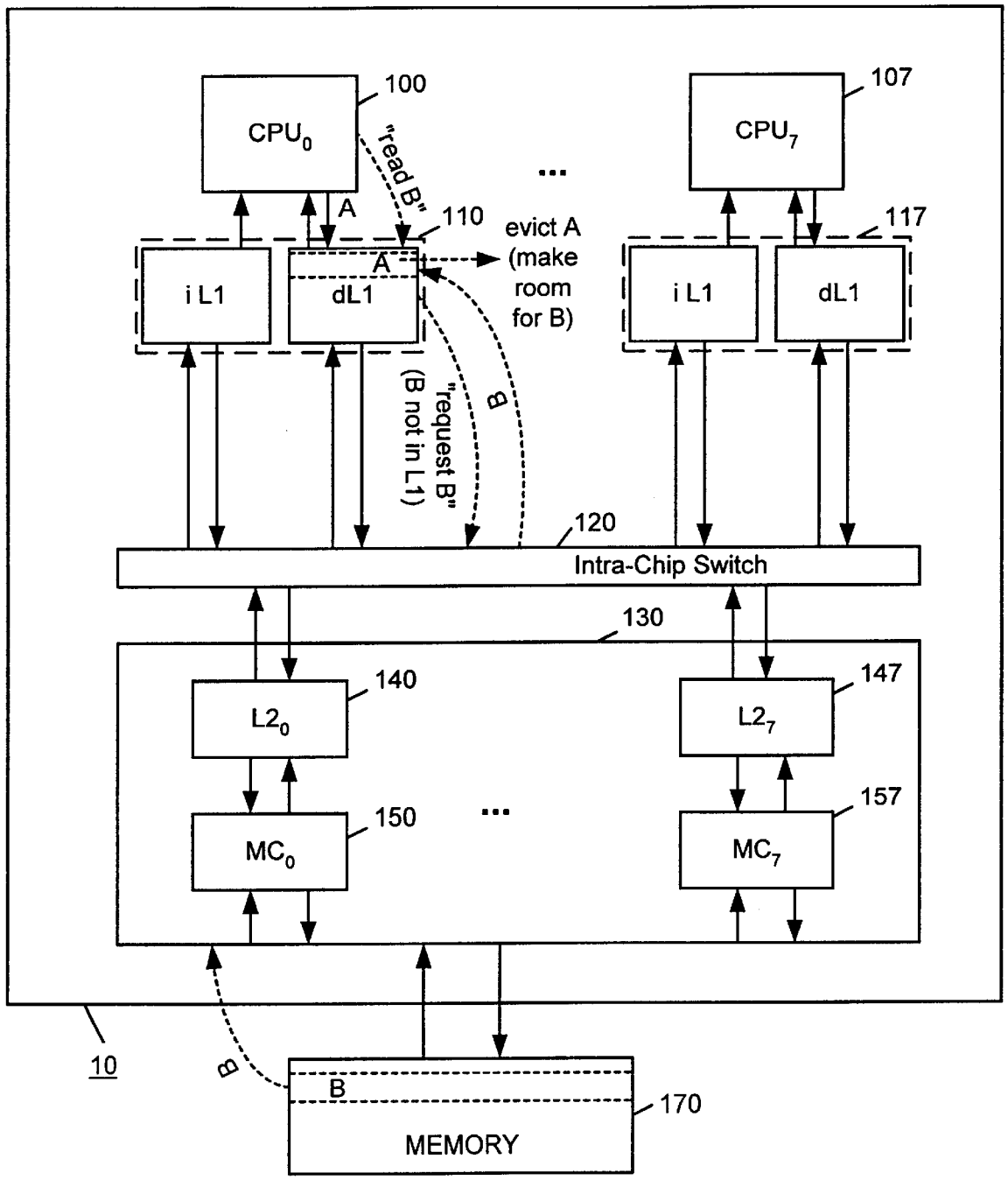

Effectively, the second-level cache (L2) is filled only when a first-level cache line is evicted as a result of a conflict miss. An L2 fill on an L1 eviction is accomplished through a write-back from L1 to L2. A cache line is evicted from the L1 in order to accommodate the L1 conflict miss and make room for the cache line that caused the L1 conflict miss (by mapping to the same set as the cache line it then replaces). FIG. 5B illustrates an eviction of a cache line (A) on a conflict miss created by a requested cache line (B). It is noted, however, that allowing all L1 evictions to cause L2 fills wastes on-chip bandwidth because a significant number of the evicted cache lines may already be present in the L2. Before a conflict miss reply to an original cache line request can be sent, in order to determine if L2 already holds the evicted first-level cache line, it is necessary to perform an L2 lookup for the cache line being evicted. Then, to avoid an L2 fill when L2 already holds the evicted first-level cache line, the no-fill/fill information can be attached to the conflict miss reply. This scheme would significantly increase the hit latency of the second-level cache (L2) since the L2 tag array lookup for the address of the evicted cache line would be necessary before the miss reply can be sent. As illustrated in FIG. 5A, the additional L2 lookup would be needed because the two cache lines that map into the same set in the first-level cache are not guaranteed to map into the same set in the second-level cache (i.e., the cache lines would not tend to populate the same set in L2 if stored in that cache). And, even if the tag lookup for the evicted line could be removed from the miss reply sequence, it would, nonetheless, double the use of L2 tag-state data structure locations.

Figure 6:
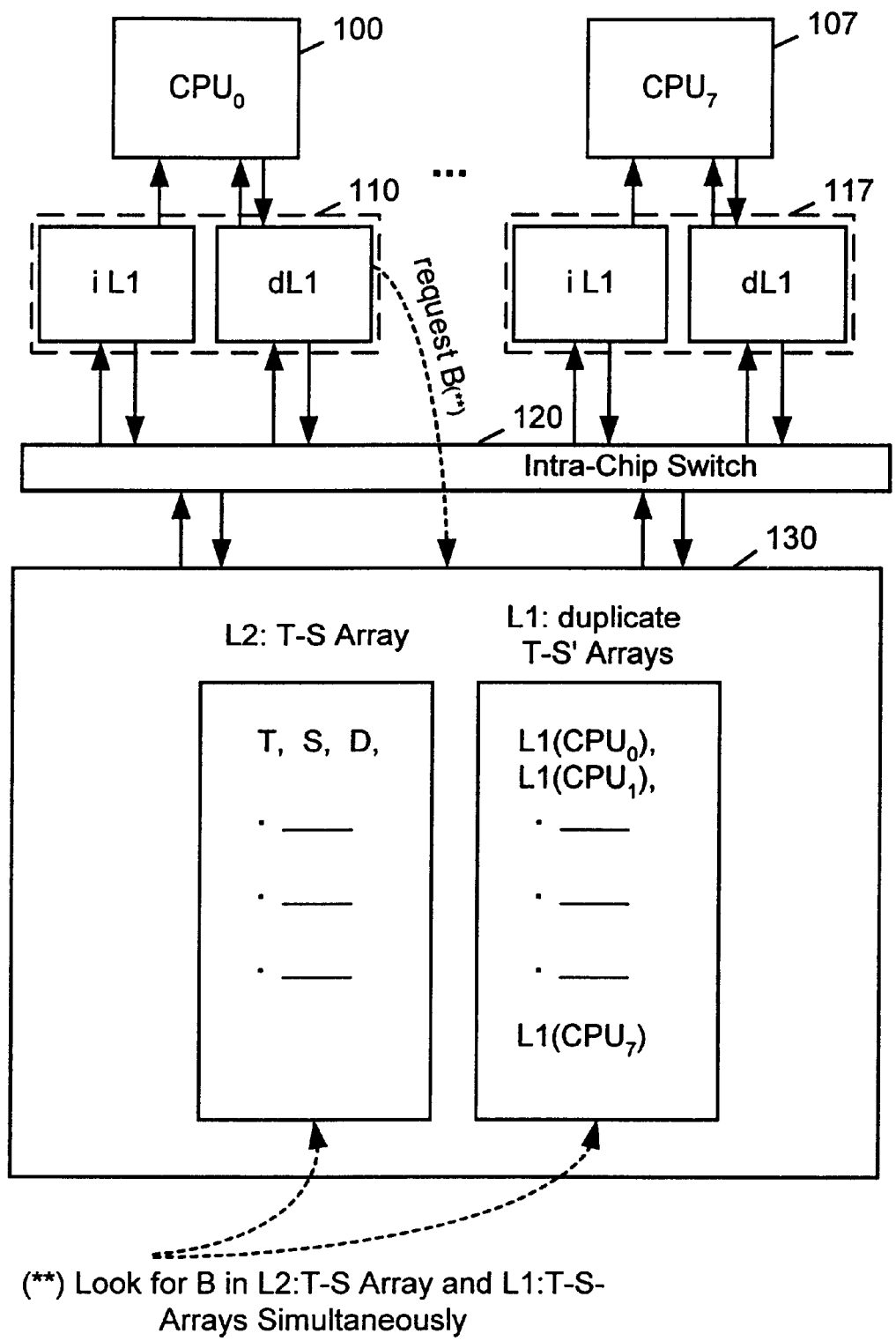

To achieve the stated goal of improved performance without the foregoing shortcomings, the design strategy for the proposed CMP system is to include L1 tag and state information in each L2 controller (MC) 150, ... 157. Preferably, each L2 controller keeps dtags, a duplicate copy of the first-level cache tag and state structures (not shown). The dtags information allows the second-level cache (L2) to keep track of all cache lines currently in the CMP chip (L1 & L2) without actually requiring it to maintain a copy of all the cache lines (i.e., data or instructions). To that end, as shown in FIG. 6, the design scheme with dtags at L2 enables a substantially simultaneous lookup, in L2, of the L2 tag-state array and the dtags (duplicate L1 tag-state arrays).

Figure 7:
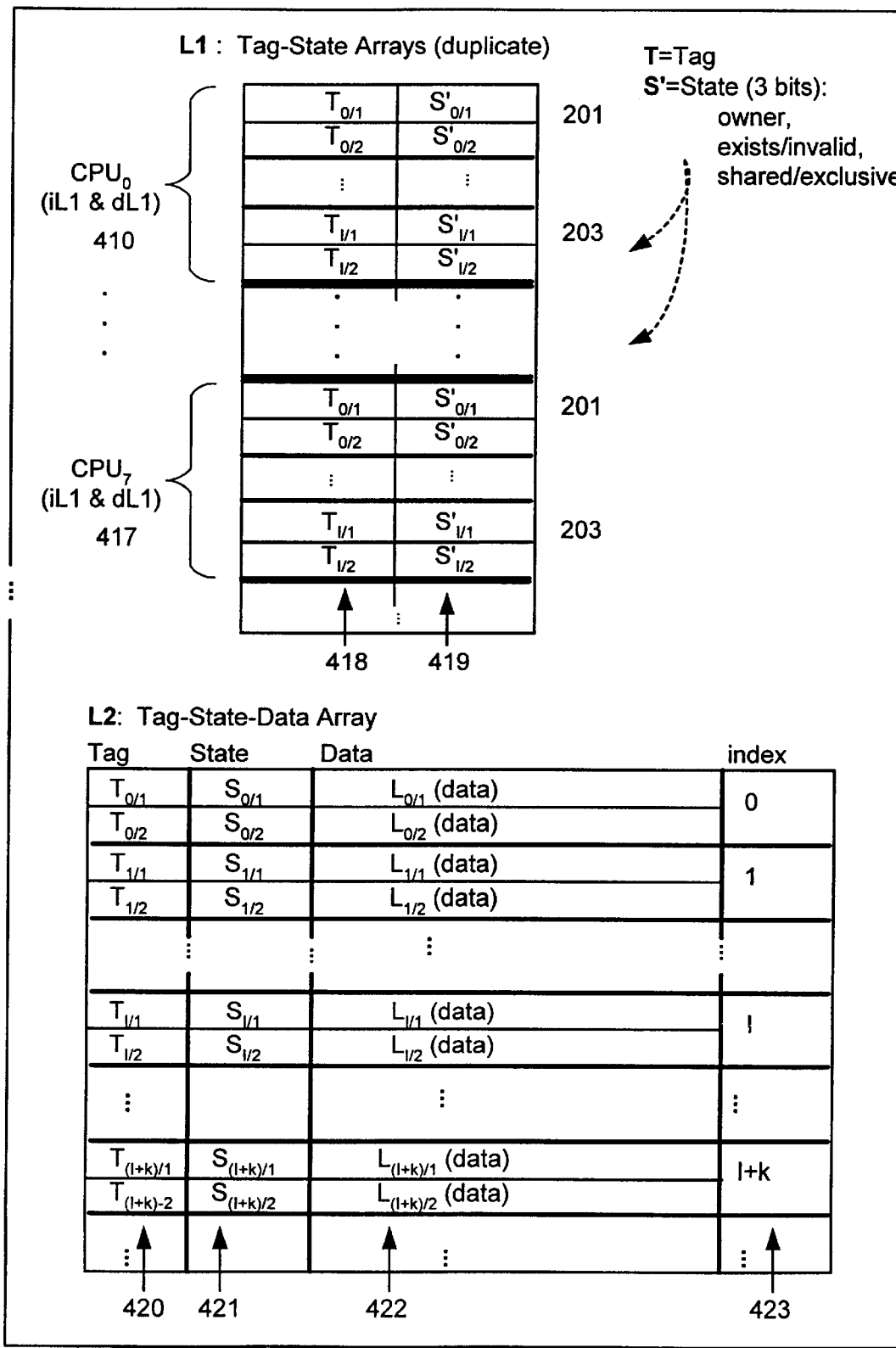
FIG. 7 shows the data structure of a second-level cache configured in accordance with the present invention.

Advantageously, the dtags information also eliminates unnecessary L2 fills from L1 without increasing the L2 hit latency or increasing its use. To that end, the state information associated with the cache lines is extended at L2 to include an ownership indication bit. Since more than one copy of a cache line can be present in the CMP system, the state information, including in the dtags, is extended in order to denote when a copy of a cache line is considered to be the owner copy within the CMP system. The owner copy can be an L1 cache line associated with a particular CPU or an L2 cache line. In order to explain how the duplicate L1 tag-state arrays (dtags) and L2 arrays are configured in accordance with the present invention, FIG. 7 illustrates the data structures at a second-level cache (L2) 130. The duplicate L1 tag-state arrays at L2 are configured in a multi-dimensional array structure with each per-CPU element 410, ... 417 of this structure having an array with one element for each dtag 201, ... 203 corresponding to an L1 cache line. The multi-dimensional array of dtags, e.g., 410, ... 417, would facilitate this approach, with each per-CPU cache populating one dimension and having its associated group of dtag entries 210, ... 203.

As noted before, the ownership bit is added only in the state of the tag-state structures at the second-level cache (L2) and is not kept at the first-level cache (L1). At L2 130, each per-CPU L1 tag-state array 410, ... 417 corresponds to, say, I cache lines, where the extended duplicate state (S') information 419 includes the valid/invalid, shared/exclusive and owner indication bits (i.e., owner/non-owner bit). The L2 tag-state array 420, 421 is associated with cache lines 422 present at L2, the second-level cache 130. The state information 421 of L2 cache lines includes valid/invalid and non-owner/owner indications.

It is noted that when a cache line is 'exclusive' it belongs only to the particular per-CPU L1 cache. Naturally, an exclusive cache line does not belong in the second-level cache (because it is by definition a shared cache). Moreover, the ownership feature is not needed when a cache line is exclusive since it is present in a single cache—which is its only possible owner. Likewise, the ownership feature is immaterial when the cache line is 'invalid'. Conversely, when a cache line is shared the ownership features is material. The following table can illustrate possible cache line states:

| | |
|---|---|
| non-owner | invalid |
| | shared |
| owner | exclusive |
| | shared |

At any given time in the lifetime of a cache line with one or more copies in the CMP system, only one copy of the cache line in the CMP system is designated as owner. And, only the owner copy of an evicted L1 cache line is expected to involve a write-back to L2 of the evicted L1 cache line. Hence, L2 is filled selectively only with owner copies in order to minimize the duplication of information in the on-chip cache hierarchy. In other words, maintaining at any given time a single owner for a cache line guarantees that only one of potentially multiple sharers of the cache line will be allowed to issue an L2 fill. As a result, associating a single owner with each cache line eliminates multiple redundant write-backs of evicted data to the second-level cache.

Moreover, by introducing the ownership feature into the structure of L2 tag-state array and the duplicate copies of L1 tag-state arrays (dtags), and by maintaining the ownership information with the dtags, it is feasible to determine whether an L2 fill is necessary in parallel with the L2 lookup and, thereby, to avoid the need for an additional L2 tag-state array lookup. With a scheme as described herein, the number of duplicate cache lines present on the CMP chip can be reduced and the overall number of on-chip cache lines can be significantly increased. This allows the CMP system to utilize more efficiently the limited on-chip cache resources and improves its overall performance.

The preferred strategy for cache line ownership administration includes a policy for determining ownership throughout the lifetime of a cache line in the CMP chip. The policy describes how the cache line ownership is determined and maintained in the CMP chip as detailed below. To simplify the explanation herein, and consistent with the example presented in the drawings (FIGS. 5A, 5B and 6), it is assumed that: 1) cache line A is initially present in a first-level cache (L1); 2) the requested cache line B is mapped to the same set that L1 cache line A maps to and causes an L1 conflict miss (as shown in FIG. 5A), i.e., B collides with A in L1; and 3) to make room for cache line B, cache line A has to be evicted from the L1 cache (associated with the requesting CPU).

Suppose also that L2 controller will receive requests for B, such as "$CPU_1$ wants B." Reasonably, L2 controller is configured to send a reply to $CPU_1$. For that, L2 controller looks for B simultaneously at both its tag-state array and the dtags, i.e., duplicate L1 tag-state arrays (As shown in FIG. 6). Then, as cache line A has to be evicted in order to make room for cache line B, a decision is made as to which, if any, of the copies of cache line A would have to be involved in a write-back from L1 to L2. Understandably, A and B could be colliding in L1 but map to different sets in L2, and in this case it is impossible to access both A and B at L2 simultaneously. Thus, it would appear that a lookup for cache line A in L2 tag-state array would be necessary as well. However, a lookup of the ownership information and dtags eliminates the need to perform this additional step. If A and B collide in L1, causing a conflict miss, the lookup for B in dtags at L2 would instead reach a tag-state entry corresponding to A within the $CPU_1$ entries of the dtag. This lookup will inform the L2 controller about all the per-CPU instances of A in the CMP system and, particularly, their state information, as well as the ownership status of A in the L1 cache of $CPU_1$. From the state information, the L2 controller may learn that it has a copy of A.

In fact, the state information discloses a number of useful facts about each instance of A. First, the valid/invalid indication bit discloses the existence of A in any of the per-CPU L1 caches. Naturally, any cache line that is found to be invalid cannot be the owner copy. Second, the shared/exclusive indication bit points out whether the cache line A is shared or is exclusive to a particular per-CPU cache. Lastly, the owner indication bit reveals whether the requesting cache holds the owner copy of A for the purpose of a write-back to L2, i.e., a second-level cache fill.

A guideline of the policy also determines that if the requested B is in L2, the L2 controller sends a copy of B to the requesting CPU (in this example $CPU_1$). Moreover, by reason of the aforementioned single owner rule, if the L2 lookup for B establishes that L2 has the requested cache line B, L2 is the owner by default (and it provides B to the requesting $CPU_1$). However, if based on the lookup for B it is established that B is not present in L2 and any of the per-CPU L1 caches, the L2 controller can request B from other chips or off-chip memory (locally connected remote DRAM). Then, the L2 controller can deliver the requested B directly to the per-CPU cache of the requesting CPU in order to save time and duplication of data. In this case it also makes the requesting CPU the owner of the cache line.

The policy guidelines allow transfers of requested cache lines between CPUs. Assuming for example that B is not exclusive, where each of the per-$CPU_1$ L1 and per-$CPU_3$ L1 has a copy of B, but only the per-$CPU_1$ L1 copy is the owner copy. Assuming further that L2 doesn't have B and $CPU_2$ issues a "read B" request to L2. In this case, L2 controller requests $CPU_1$ to give the owner copy to $CPU_2$. Since the per-$CPU_3$ L1 copy of B is not the owner copy, $CPU_3$ will not be asked to furnish the requested cache line B. In response to the L2 controller request, $CPU_1$ will acknowledge sending B to $CPU_2$ (via the intra-chip switch).

It is noted that $CPU_1$ could remain the owner (i.e., maintain the cache line in its owner copy state). However, the proposed design transfers ownership to $CPU_3$. In other words, preferably, the most recent recipient of a cache line becomes the new owner of that cache line. The reason for this approach is the need to balance the load on the processors in the CMP system. With an unbalanced load scenario, $CPU_1$, the present owner, will be overburdened with service requests and be slowed down. Passing ownership spreads the load across all the CPUs.

In summary, the present invention provides an implementation of a functional and architectural strategy that maximizes the use of on-chip cache memory capacity in CMP systems. This strategy is realized by a combination of features including the features described in details herein. One such feature is a relaxed the subset property (inclusion) requirement. This property forms an exclusive cache hierarchy in order to minimize data replication and on-chip data traffic without incurring increased second level hit latency or occupancy. Another aspect involves maintaining in the second-level cache a duplicate tag-state structure of all (per-CPU) first-level caches in order to allow a simultaneous lookup for data in the first-level and second-level tag-state arrays without having to replicate the data. An additional aspect involves extending the state information to include ownership indication in addition to the data valid/invalid indication and data shared/exclusive indication. The ownership aspect lives in the exclusive two-level cache hierarchy. Likewise, the idea of duplicate tag-state array (in L2) exists in an exclusive cache hierarchy. Yet another aspect involves associating a single owner with each cache line in order to substantially eliminate multiple write-backs of evicted data to the second-level cache. Namely, at any given time in the lifetime of a cache line in the CMP chip, only one of its copies can be the owner copy. Finally, the present invention provides policy-guidelines for administering the ownership and write-back aspects, as the following guidelines exemplify:

a) A first-level cache miss that finds no other copy of a requested cache line becomes the owner of the cache line.
b) A first-level cache miss that does not find a copy of a cache line in the second-level cache but finds it in one or more than one of the first-level caches receives that cache line from the previous owner and becomes the new owner.

c) A first-level cache that replaces a cache line, is informed by the second-level cache whether it is the owner, in which case it issues a second level cache fill.

d) Whenever the second-level cache has a copy of the cache line, it is the owner. A first-level cache miss that hits in the second-level cache without invalidating it (i.e., not a write miss) does not steal ownership from the second-level cache.

e) Whenever the second-level cache needs to evict a cache line that is additionally present in one or more first-level caches the second-level cache arbitrarily selects one of these first-level caches as the new owner.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents. No additional communication is needed between the second-level and first-level caches in this case since first-level cache ownership status is kept only in the dtags.

What is claimed is:

1. A method for exclusive two-level caching in a chip-multiprocessor; comprising:

relaxing the inclusion requirement in a two-level cache system in order to form an exclusive cache hierarchy;

providing a first tag-state structure in a first level cache of the two-level cache system, the first tag-state structure having state information;

maintaining in a second-level cache of the two-level cache system a duplicate of the first tag-state structure;

extending the state information in the duplicate of the first tag-state structure, but not in the first tag-state structure, to include an owner indication;

providing in the second-level cache a second tag-state structure so that a simultaneous lookup at the duplicate of the first tag-state structure and the second tag-state structure is possible; and at any given time of a cache line lifetime in the chip-multiprocessor, associating a single owner with the cache line.

2. A method as in claim 1, wherein the second tag-state structure in the second-level cache includes valid and owner indications.

3. A method as in claim 1, wherein each first-level cache is associated with and is private to a particular processor in the chip-multiprocessor, and wherein all processors in the chip multiprocessor share the second-level cache.

4. A method as in claim 1, wherein the exclusive cache hierarchy is formed to minimize data replication and on-chip data traffic without incurring increased second-level hit latency or occupancy.

5. A method as in claim 1, wherein the duplicate of the first tag-state structure is maintained in the second-level cache in order to allow the simultaneous lookup without having to replicate cache lines.

6. A method as in claim 1, further comprising:

determining which instance of one or more copies of a particular cache is the owner copy of that cache line by using information obtained from the simultaneous lookup respecting that cache line.

7. A method as in claim 1, wherein the simultaneous lookup respecting a particular cache line yields the state information of one or more instances of the particular cache line that are present in the first-level cache and/or the second-level cache, the state information for each instance of that cache line including its owner state, and wherein the owner state of only one instance is owner.

8. A method as in claim 1, wherein if the substantially simultaneous lookup yield no instance of the particular cache line in the first-level cache which is owner, the instance in second-level cache is owner by default.

9. A method as in claim 1, wherein associating a single owner with each cache line eliminates unnecessary second-level fills, thereby maximizing the effective use of the two-level cache in the chip-multiprocessor.

10. A method as in claim 1, wherein the state information in the first tag-state and duplicate of the first tag-state structures includes valid/invalid indication and shared/exclusive indication, wherein a cache line instance found to be invalid cannot be owner, and wherein a cache line instance that is found to be exclusive cannot be involved in a write-back to the second level cache.

11. A two-level cache system in a chip-multiprocessor; comprising:

means for relaxing the inclusion requirement in the two-level cache system in order to form exclusive two-level caching;

means for providing a first tag-state structure in a first level cache of the two-level cache system, the first tag-state structure having state information;

means for maintaining in a second-level cache of the two-level cache system a duplicate of the first tag-state structure;

means for extending the state information in the duplicate of the first tag-state structure, but not in the first tag-state structure, to include an owner indication;

means for providing in the second-level cache a second tag-state structure so that a simultaneous lookup at the duplicate of the first tag-state structure and the second tag-state structure is possible; and means for associating a single owner with a cache line at any given time of its lifetime in the chip-multiprocessor.

12. A two-level cache system as in claim 11, wherein the second tag-state structure in the second-level cache includes valid and owner indications.

13. A two-level cache system as in claim 11, wherein each first-level cache is associated with and is private to a particular processor in the chip multiprocessor, and wherein all processors in the chip multiprocessor share the second-level cache.

14. A two-level cache as in claim 11, wherein the system can be implemented in hardware or software or a combination of both.

15. A two-level cache system in a chip-multiprocessor, comprising:

a plurality of per-processor first level caches, each including an instruction cache and a data cache and each maintaining a first tag-state structure with state information;

an interconnect device;

a second-level cache shared by all the processors, the per-processor first-level caches interfacing with each other and the second cache via the interconnect device, the second-level cache including one or more modules each of which including, storage for a second tag-state structure with its associated state information, a memory controller configured to operatively interface with the processors, a memory, and storage for a duplicate of the first tag-state structures, the state information in the duplicate being extended to include an indication of owner, wherein the two-level cache system is configured so that during a lifetime of a cache line in the chip-multiprocessor only one instance of the cache line, either in the first-level cache or the second-level cache, can be the owner.

16. A two-level cache system as in claim 15, wherein each of the plurality of per-processor first-level cache is configured as an N-way set associative cache, where N is equal to or greater than 1.

17. A two-level cache system as in claim 15, wherein each of the plurality of per-processor first-level cache is configured as an 2-way set associative cache.

18. A two-level cache system as in claim 15, wherein the memory in the second-level cache includes a plurality of DRAM (dynamic read only memory) components.

* * * * *